(12) United States Patent
Diggins

(10) Patent No.: US 9,996,906 B2
(45) Date of Patent: Jun. 12, 2018

(54) ARTEFACT DETECTION AND CORRECTION

(71) Applicant: Imagination Technologies Limited, Kings Langley (GB)

(72) Inventor: Jonathan Diggins, Waterlooville (GB)

(73) Assignee: Imagination Technologies Limited, Kings Langley (GB)

( * ) Notice: Subject to any disclaimer, the term of this patent is extended or adjusted under 35 U.S.C. 154(b) by 0 days. days.

(21) Appl. No.: 15/378,977

(22) Filed: Dec. 14, 2016

(65) Prior Publication Data

US 2017/0178295 A1 Jun. 22, 2017

(30) Foreign Application Priority Data

Dec. 17, 2015 (GB) .................................. 1522328.2

(51) Int. Cl.
  *G06T 5/00* (2006.01)
  *G06T 7/00* (2017.01)
  *G06K 9/00* (2006.01)
  *G06T 7/223* (2017.01)

(52) U.S. Cl.
  CPC .......... *G06T 5/002* (2013.01); *G06K 9/00758* (2013.01); *G06T 7/0002* (2013.01); *G06T 7/223* (2017.01); *G06T 2207/20021* (2013.01)

(58) Field of Classification Search
  None
  See application file for complete search history.

(56) References Cited

U.S. PATENT DOCUMENTS

| | | | | | |
|---|---|---|---|---|---|
| 5,910,820 | A | * | 6/1999 | Herz | H04N 7/012 348/446 |
| 8,842,730 | B2 | * | 9/2014 | Zhou | G06T 3/4007 375/240.12 |
| 2009/0161010 | A1 | * | 6/2009 | Tran | H04N 7/014 348/441 |

(Continued)

FOREIGN PATENT DOCUMENTS

| | | | |
|---|---|---|---|
| WO | 2007/085950 A2 | 8/2007 | |
| WO | 2011/094871 A1 | 8/2011 | |
| WO | WO 2011094871 A1 * | 8/2011 | ............. H04N 5/145 |

*Primary Examiner* — Delomia L Gilliard
(74) *Attorney, Agent, or Firm* — Vorys, Sater, Seymour and Pease LLP; Vincent M DeLuca

(57) ABSTRACT

An artifact detector detects artifacts in a video sequence comprising interpolated frames generated by performing motion estimation. The detector comprises a pixel processor which processes pixel values in first and second input frames of the video sequence to identify respective blocks of pixels representing an image feature. A feature-matching module matches identified blocks in the first input frame with corresponding identified in the second input frame to determine matched block pairs. For each matched block pair, a feature-detector module: (i) identifies a block of an interpolated frame between the first and second input frames corresponding to the matched block pair, and (ii) characterizes the corresponding block of the interpolated frame as an artifact in dependence on a determination of whether said corresponding block does or does not represent the image feature. A corrector module corrects the interpolated frame based on the characterization of the blocks of the interpolated frame.

20 Claims, 9 Drawing Sheets

(56) References Cited

U.S. PATENT DOCUMENTS

| | | | |
|---|---|---|---|
| 2009/0161011 A1* | 6/2009 | Hurwitz | G06T 3/4007 |
| | | | 348/459 |
| 2009/0208123 A1* | 8/2009 | Doswald | H04N 19/132 |
| | | | 382/236 |
| 2012/0033130 A1* | 2/2012 | Piek | H04N 19/132 |
| | | | 348/441 |
| 2018/0020229 A1* | 1/2018 | Chen | H04N 19/51 |

* cited by examiner

ARTEFACT DETECTION AND CORRECTION

BACKGROUND

This invention relates to a system and method for detecting artefacts in frames generated for inclusion in a video sequence.

A video sequence comprises a plurality of frames which are to be played out sequentially. The frame rate of a video sequence indicates the rate at which the frames are to be played out in order to correctly play the video sequence. For example, a video sequence may be a film having a frame rate of 24 frames per second. As another example, a video sequence may have a frame rate of 50 or 60 frames per second (e.g. for television broadcast). Other video sequences may have other frame rates. Each frame of the video sequence comprises a plurality of pixels which form an image. For example, a frame of a High Definition video sequence may for example be an image formed by an array of pixel values at each of 1920×1080 possible pixel locations.

In other examples pixel values may exist at some, but not all, of the possible pixel locations. For example, in an interlaced system, pixel values may exist for alternate rows of the possible pixel locations, such that a partial image is formed. These partial images may be known as "fields", and two fields, often sampled at different times, comprise a complete frame. In these other examples, multiple partial images (or "fields") may be used to determine complete images (or "frames"), e.g. by a process called de-interlacing.

For clarity, the following description describes systems operating on complete frames. All of the methods described may equally be applied to video sequences comprising fields or complete frames, and the use of the term "frame" should be understood to refer to either complete frames or fields as appropriate.

A frame rate converter may be used to alter the frame rate of a video sequence. A process of frame rate conversion applied by a frame rate converter may include adding frames into the video sequence and/or removing frames from the video sequence. In a simple example, a frame rate converter may double the frame rate of a video sequence (e.g. from 24 frames per second to 48 frames per second) by inserting a frame between each pair of existing frames in the video sequence. In one example, each of the frames which are inserted into the video sequence may simply be a copy of one of the existing frames, e.g. such that each frame of the existing video sequence is played out twice in a row, but at twice the speed of the original video sequence. In this example, the perceptual smoothness of the video sequence might not be significantly improved by doubling the frame rate, but this frame rate conversion does allow the video sequence, which originally has one frame rate, to be outputted at a different frame rate (e.g. when a film is broadcast on a television signal).

More complex frame rate converters attempt to determine what a frame would look like at a point in time between two of the existing frames of the video sequence to thereby generate a new frame for inclusion in the video sequence between the two existing frames. For example, a frame rate converter may contain a motion estimator that performs a motion estimation stage to track the way that parts of an image move between one frame and the next. A common motion estimator is the block-based type, in which a frame of a video sequence is divided into a number of blocks each containing one or more pixels, and for each block a vector (referred to as a "motion vector") is found that represents the motion of the pixels in that block between the two existing frames. In one example, the determination of the motion vector for a block of a current frame involves searching the previous frame in the video sequence to find the area of image data of the previous frame with contents that are most similar to the contents of the block of the current frame. Other factors may also be involved in the determination of the motion vector for a block. The motion vectors can be used to produce an interpolated frame at an intermediate position (given by a temporal phase, $\varphi$) between two existing frames in a video sequence. For example, if the interpolated frame is to be included at the mid-point between two adjacent existing frames (i.e. if the temporal phase, $\varphi$, of the interpolated frame is 0.5) then the motion vectors determined between the two existing frames may be halved (i.e. multiplied by the temporal phase, $\varphi$) and then used to determine how the image in one of the existing frames should be changed for use in representing the interpolated frame.

Interpolated frames generated by a frame rate converter may contain Frame Rate Conversion (FRC) artefacts arising from different causes. An example of one such type of FRC artefact is where part of an image has been erroneously eliminated such that it does not appear in the interpolated frame. This type of artefact may be associated with image features that are 'subtle', or 'delicate', compared to a more dominant background. An image feature may be considered to be "subtle" compared to the background/foreground if the image feature does not significantly contribute to the character of a block of pixels which is to be considered for motion estimation, e.g. if the image feature is small in at least one dimension compared to the size of the blocks of pixels which are considered for motion estimation. An example of such image features may be features in the form of thin lines, such as telephone lines, rigging of sails on a ship, or wire fences.

To illustrate how this type of artefact may arise, consider the following example in which a motion estimator is used to determine the motion vector between a block of pixels in a current frame and a block of pixels in a previous frame with contents that are most similar to the block of the current frame. If the block of pixels in the current frame contains a subtle image feature contrasted against a dominant background or foreground (for example the image feature is a thin line), then the motion estimator may be able to obtain a good match with a block of pixels in the previous frame that does not contain the image feature (for example because the backgrounds/foregrounds of the two blocks dominate the matching process and provide a sufficiently good match). The subtle object and the dominant background/foregrounds may for example have different motion vectors that describe their respective motion between the current and previous frames, but only one motion vector can be associated with the block. If the background/foreground is dominant, then the motion of the background/foreground can provide a good match with a block in the previous frame whereas the motion vector corresponding to the subtle object may give rise to a poor match with a block in the previous frame because it may only represent a good match on a small number of pixels within the area of the subtle object. The motion estimator may thus select a motion vector for the dominant background/foreground objects that results in an interpolated image being generated without the subtle image feature present. Conversion artefacts of this type have the undesirable effect of causing the subtle feature to flicker when the sequence of frames is displayed to a user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In frame rate conversion, an interpolated frame may be generated for inclusion within a video sequence that comprises first and second existing frames (i.e. the first and second frames exist as part of the video sequence which is subject to frame rate conversion). The interpolated frame may be generated by performing a first motion estimation stage in which at least one motion vector between the first and second existing frames is calculated. The first motion estimation stage may be performed at least in part by a motion estimator of the frame rate converter, e.g. as discussed above. Conversion artefacts of the type discussed above (e.g. where an image feature is missing from an interpolated frame) are detected by processing pixel values in first and second input images to identify respective blocks of one or more pixels as representing an image feature. Identified blocks in the first input image are matched with identified blocks in the second input image to form a set of matched block pairs. Based on each matched block pair, a corresponding block in the interpolated frame is identified and characterised as an artefact in dependence on a determination of whether that block does or does not represent the image feature represented by the corresponding matched block pair. Thus, image features present in two existing frames of the video sequence are searched for in a block of the interpolated frame. If they are not found, the block in the interpolated frame may be characterised as an artefact.

In particular, there is provided an artefact detector configured to detect artefacts in a video sequence comprising interpolated frames generated by performing a first motion estimation stage, the detector comprising: a pixel processor configured to process pixel values in first and second input frames of the video sequence to identify respective blocks of one or more pixels representing an image feature; and a feature-matching module configured to match identified blocks in the first input frame with corresponding identified blocks in the second input frame to determine a set of matched block pairs. The artefact detector further comprises a feature-detector module configured to, for each matched block pair: (i) identify a block of an interpolated frame between the first and second input frames corresponding to the matched block pair, and (ii) characterise said corresponding block of the interpolated frame as an artefact in dependence on a determination of whether said corresponding block does or does not represent the image feature. The artefact detector further comprises a corrector module configured to correct the interpolated frame based on the characterisation of the blocks of the interpolated frame.

The artefact detector further comprises a frame filter configured to receive first and second existing frames in the video sequence and to filter said existing frames to generate the first and second input frames having enhanced fine image-detail.

The pixel processor may be configured to identify respective blocks of one or more pixels representing image features depicting fine image-detail.

The pixel processor may be configured to identify a block as representing an image feature in response to identifying the block as a regional maximum.

The pixel processor may be configured to process the pixel values in the first and second input frames to determine the intensity of each processed pixel, and to identify a block of one or more pixels as a regional maximum in response to at least one of:
  (i) detecting that the intensity of said block is greater than the intensity of each pixel of a subset of local pixels;
  (ii) detecting that the intensity of said block is greater than a predetermined threshold value.

The feature-matching module may be configured to perform a second motion estimation stage to match identified blocks in the first input frame with respective identified in the second input frame, and to determine a motion estimate between the blocks of each matched block pair as part of the second motion estimate stage.

The feature-matching module may comprise a search module configured to, for each identified block in the first input frame, conduct a motion search in the second input frame to detect a matching identified block as part of the second motion estimation stage.

The search module may be configured to conduct a plurality of search operations along respective directional axes as part of the motion search.

The search module may be configured to conduct the plurality of search operations in the second input frame along directional axes emanating from a common origin that is coincident with the identified block in the first input frame.

The search module may be configured to flag identified blocks detected in the plurality of search operations as candidate matching blocks to the identified block in the first input frame.

The feature-matching module may be further configured to perform pixel processing on the candidate matching blocks in the second input frame to select a block from the candidate blocks as the matching identified block to the identified block in the first input frame.

The feature-matching module may be configured to, for each candidate block, determine a level of agreement between a subset of pixels in the second input frame that encompasses the candidate matching block and a corresponding subset of pixels in the first input frame, and to select as the matching identified block the candidate block associated with the best level of agreement.

The feature-matching module may be configured to determine the motion estimate between the blocks of each matched block pair from the directional axis of the search operation used to detect the respective matching block in the second input frame.

The search module may be further configured to, for each identified block in the second input frame, conduct a motion search in the first input frame to detect a matching identified block, and the feature matching module may thereby be configured to determine a set of matched block pairs comprising a first subset determined from the motion search in the second input frame and a second subset determined from the motion search in the first input frame.

The feature detector module may be configured to, for each matched block pair, identify the block of the interpolated frame corresponding to the matched block pair using the motion estimate between the blocks of the matched block pair.

The feature-detector module may be configured to, for each matched block pair, process a subset of pixels in the interpolated frame to identify said corresponding block of the interpolated frame.

The feature-detector module may be configured to identify the subset of pixels in the interpolated frame in dependence on the positional relationship of the matched block pair.

The feature detector module may be configured to identify the subset of pixels in the interpolated frame in dependence on the position of one block of the matched block pair and the directional axis of the search operation used to detect the matching block of the matched block pair.

The feature-detector module may be configured to process the subset of pixels in the interpolated frame to determine the block within the subset with the largest intensity value, and to identify that block as said corresponding block of the interpolated frame.

The feature-detector module may be further configured to, for each matched block pair: process said corresponding block to determine its intensity and to calculate a first parameter associated with said corresponding block that indicates either that said corresponding block represents the image feature or does not represent the image feature.

The first parameter may be calculated from the difference between the intensity value of said corresponding block and an average of intensity values of the matched block pair in the first and second input frames.

The feature-detector module may be configured to determine that said corresponding block does not represent the image feature if the magnitude of a difference between the value of the first parameter and a predetermined value is greater than a threshold value, and to determine that said corresponding block does represent the image feature if the magnitude of the difference between the value of the first parameter and the predetermined value is less than the threshold value.

The feature-detector module may be further configured to calculate a second parameter based on the intensities of the matched block pair that indicates whether said corresponding block of the interpolated frame is expected to represent the image feature or not.

The second parameter may indicate that the block of one or more pixels in the interpolated frame is expected to represent the image feature if the magnitude of its value is above a threshold value.

The feature-detector module may be configured to determine that said corresponding block is an artefact in response to determining from the first and second parameters that said corresponding block does not represent the image feature and that said corresponding block is expected to represent the image feature.

The feature-detector module may be configured to characterise said corresponding block of the interpolated image as an artefact in response to detecting a set of conditions comprising: i) determining that said corresponding block does not represent the image feature; and ii) detecting a predetermined number of other blocks in the interpolated image corresponding to other matched block pairs within a vicinity of said corresponding block that do not represent an image feature.

The other matched block pairs may be from either the first subset of matched block pairs or the second subset of matched block pairs.

The artefact detector may further comprise a refinement module configured to further characterise as an artefact each block of the interpolated frame that has within its vicinity a number of blocks characterised by the feature-detector module as an artefact greater than a threshold value, independently of whether said each block does or does not represent an image feature.

The corrector module may be configured to correct each block of the interpolated frame characterised as an artefact.

The corrector module may be configured to correct each block characterised as an artefact by replacing each block characterised as an artefact with one of: i) the identified block of the first input frame from the corresponding matched block pair; ii) the identified block of the second input frame from the corresponding matched block pair; iii) a blend of the identified blocks of the corresponding matched block pair.

According to a second aspect of the present disclosure there is provided method of detecting artefacts in a video sequence comprising interpolated frames generated by performing a first motion estimation stage, the method comprising: processing pixel values in first and second input frames of the video sequence to identify respective blocks of one or more pixels representing an image feature; matching identified blocks in the first input frame with corresponding identified blocks in the second input frame to determine a set of matched block pairs; for each matched block pair: (i) identifying a block of an interpolated frame between the first and second input frames corresponding to the matched block pair; and (ii) characterising said corresponding block of the interpolated frame as an artefact in dependence on a determination of whether said corresponding block does or does not represent the image feature; and
correcting the interpolated frame based on the characterisation of the blocks of the interpolated frame.

The artefact detector as claimed may be embodied in hardware on an integrated circuit. There may be provided a method of manufacturing, at an integrated circuit manufacturing system, the artefact detector. There may be provided an integrated circuit definition dataset that, when processed in an integrated circuit manufacturing system, configures the system to manufacture the artefact detector. There may be provided a non-transitory computer readable storage medium having stored thereon a computer readable description of an integrated circuit that, when processed, causes a layout processing system to generate a circuit layout description used in an integrated circuit manufacturing system to manufacture the artefact detector.

There may be provided an integrated circuit manufacturing system comprising: a non-transitory computer readable storage medium having stored thereon a computer readable integrated circuit description that describes the artefact detector as claimed; a layout processing system configured to process the integrated circuit description so as to generate a circuit layout description of an integrated circuit embodying the artefact detector; and an integrated circuit generation system configured to manufacture the artefact detector according to the circuit layout description.

There may be provided computer program code for performing a method of detecting artefacts as claimed. There may be provided a non-transitory computer readable storage medium having stored thereon computer readable instructions that, when executed at a computer system, cause the computer system to perform the method as claimed.

The above features may be combined as appropriate, as would be apparent to a skilled person, and may be combined with any of the aspects of the examples described herein.

BRIEF DESCRIPTION OF THE DRAWINGS

Examples will now be described with reference to the accompanying drawings. In the drawings.

Figure 1:
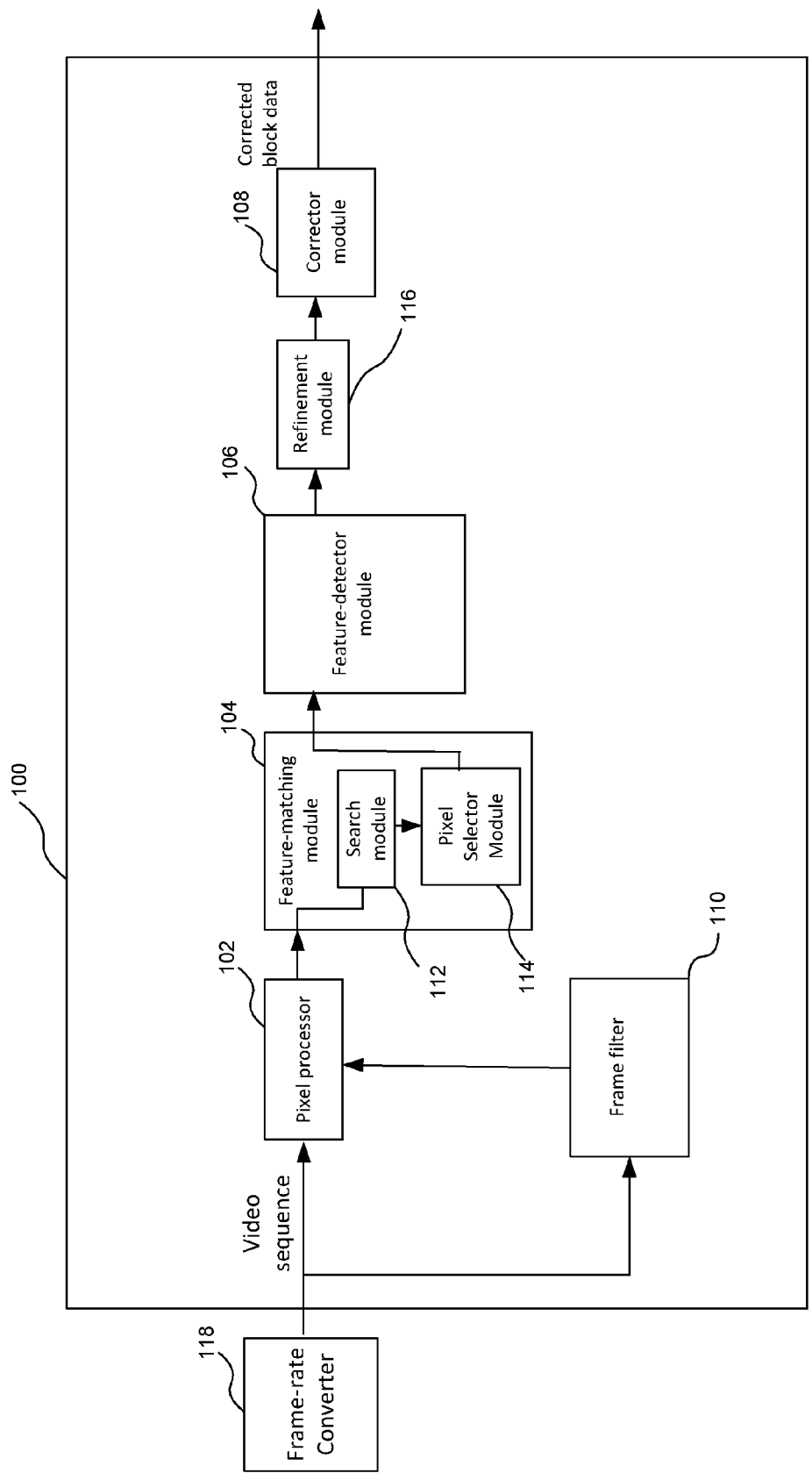
FIG. 1 shows a schematic diagram of a conversion artefact detector configured to detect a conversion artefact in an interpolated frame.

Common reference numerals are used, where appropriate, to indicate common or similar features.

DETAILED DESCRIPTION

As described above, small or subtle image objects contrasted against a dominant foreground or background can be erroneously eliminated by a frame rate converter (FRC) that generates interpolated, or intermediate frames for inclusion within a video sequence when the granularity of the interpolation is significantly larger than the small/subtle objects. This can cause the image feature to flicker when the video sequence is played out to a user. Examples described herein are directed to an artefact detector and corresponding method to detect such conversion artefacts in a generated interpolated frame. By detecting the conversion artefacts, corrective action (e.g. smoothing or blending) can be taken to reduce the effect of the artefact in the interpolated frame to thereby improve the perceived quality of the video sequence by the user.

Figure 4:
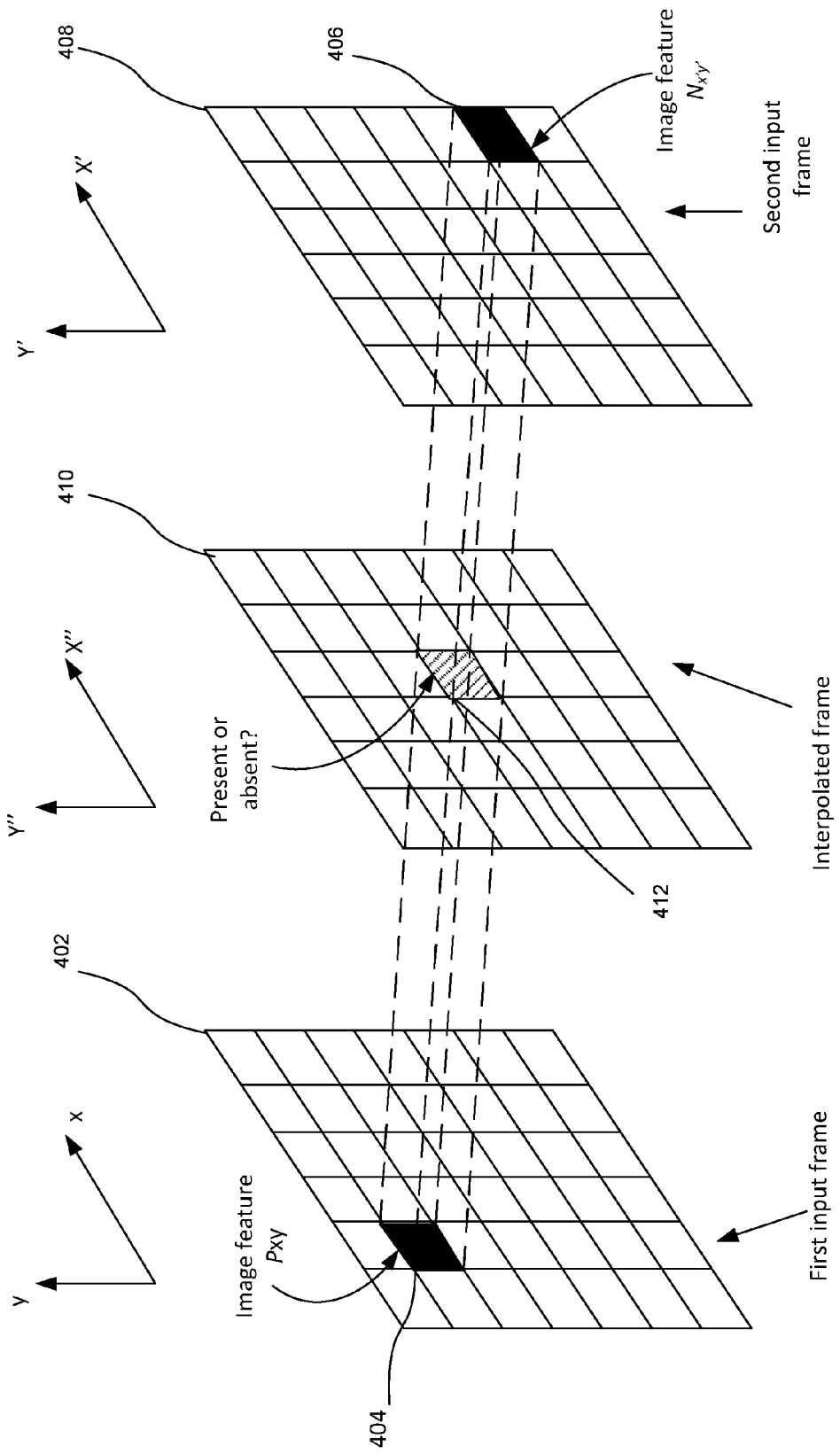
FIG. 4 shows an interpolated frame included between first and second input frames.

An overview of how the artefact detector operates to detect conversion artefacts is provided with reference to FIG. 4, which shows an interpolated frame 410 generated for inclusion within a sequence of input frames comprising first input frame 402 and second input frame 408. Each of the frames is shown here as being composed of a grid of picture, or frame, elements. Each frame element may be a single pixel, or a block or tile of one or more pixels. For the purposes of illustration, in this example each frame element is a single pixel. The use of "first" and "second" herein when referring to frames is not being used to imply a temporal order of the frames within the sequence, but instead is being used merely to label two frames of the sequence. Pixels in the first and second input frames are processed to identify image features. Pixels in the first input frame that are identified as containing an image feature (e.g. pixel 404) are then matched with pixels in the second input frame that are identified as containing an image feature (e.g. pixel 406) to form a set of matched pixel pairs. In this example pixels 404 and 406 constitute a matched pixel pair.

If the pixels are matched, a pixel in the interpolated frame corresponding to the matched pixel pair is identified (illustrated here as pixel 412). The corresponding pixel 412 in the interpolated frame is processed to determine whether it does or does not represent the image feature represented by the pixels 404 and 406. The corresponding pixel is then characterised as an artefact in dependence on that determination. That is, pixels in the interpolated frame are processed to determine if there is evidence that a connected pair of image features in the first and second input images exists, but there is no corresponding image feature in the interpolated image.

Although the above examples described with reference to FIG. 4 illustrates matching pixel pairs and using the matched pairs to identify a pixel in the interpolated frame, it is to be noted this is for the purpose of illustration only and that the artefact detector may operate in an analogous way if each frame element in FIG. 4 were to represent a block, or tile, of one or more pixels. That is, blocks (or tiles) of pixels in the first and second input frame may be processed to identify image features. Blocks in the first frame identified as containing an image feature (e.g. block 404) may then be matched with blocks in the second input frame that are identified as containing an image feature (e.g. block 406) to form a set of matched block pairs. If the blocks are matched, a block in the interpolated frame (e.g. block 412) is processed to determine whether it does or does not represent the image feature represented by its corresponding matched block pair. In the remainder of the description, the operation of the artefact detector is illustrated with reference to examples in which the artefact detector operates on a per-pixel resolution. Again, this is merely for the purposes of illustration and the following description applies analogously to situations in which each frame element in the input and interpolated frames 402, 408 and 410 represents a block or tile of one or more (contiguous) pixels.

FIG. 1 shows an example of a conversion artefact detector (CAD) 100 configured to detect artefacts in an interpolated frame. The CAD may be an example of a more general artefact detector. The interpolated frame may be generated for inclusion within a video sequence that comprises first and second existing frames by performing a first motion estimation stage in which at least one motion vector between the first and second frames is calculated. The interpolated frame may be generated by a frame-rate converter (FRC) 118. The conversion artefact detector (CAD) 100 comprises a pixel processor 102; a feature-matching module 104 that comprises a search module 112 and a pixel selector module 114; a feature-detector module 106; a corrector module 108, a frame filter 110 and a refinement module 116.

The CAD 100 receives at an input a video sequence. The video sequence may for example be output by the FRC 118. The video sequence comprises both a plurality of existing frames and a plurality of interpolated frames. Existing frames may refer to frames that form part of the sequence that is subject to frame rate conversion. The existing frames may be the frames that are input to the FRC, for example. Interpolated frames refer to frames that are generated for inclusion within the video sequence as part of the frame rate conversion of that video sequence. Each interpolated frame may be generated from two existing frames in the video sequence by performing a first motion estimation stage in which at least one motion vector between the first and second frames is calculated. The interpolated frames may be generated by the FRC. The video sequence is received by an input of the pixel processor 102 and frame filter 110. An output of the frame filter is coupled to a second input of the pixel processor. An output of the pixel processor is coupled to an input of the feature-matching module 104. In particular, the output of the pixel processor may be coupled to an input of the search module 112. An output of the search module may be coupled to an input of the pixel selector 114. An output of pixel selector module is coupled to an input of the feature detector module 106. In particular, the input of the feature-detector module may be coupled to an output of the pixel selector module 114. An output of the feature-detector module 106 may be coupled as shown to an input of the refinement module 116. An output of the refinement module is coupled to an input of the corrector module 108. An output of the corrector module is arranged to output corrected tile data for an interpolated frame but could alternatively provide output data that flags the presence of an artefact for correction by an external module and/or provide feedback to the FRC for future processing. The modules, processors and filters of the conversion artefact detector 100 shown in FIG. 1 may be implemented in hardware, firmware, software, or a combination thereof. The conversion artefact detector 100 may be implemented within a device which comprises other components such as a memory and other processing modules which are not shown in FIG. 1.

Figure 2:
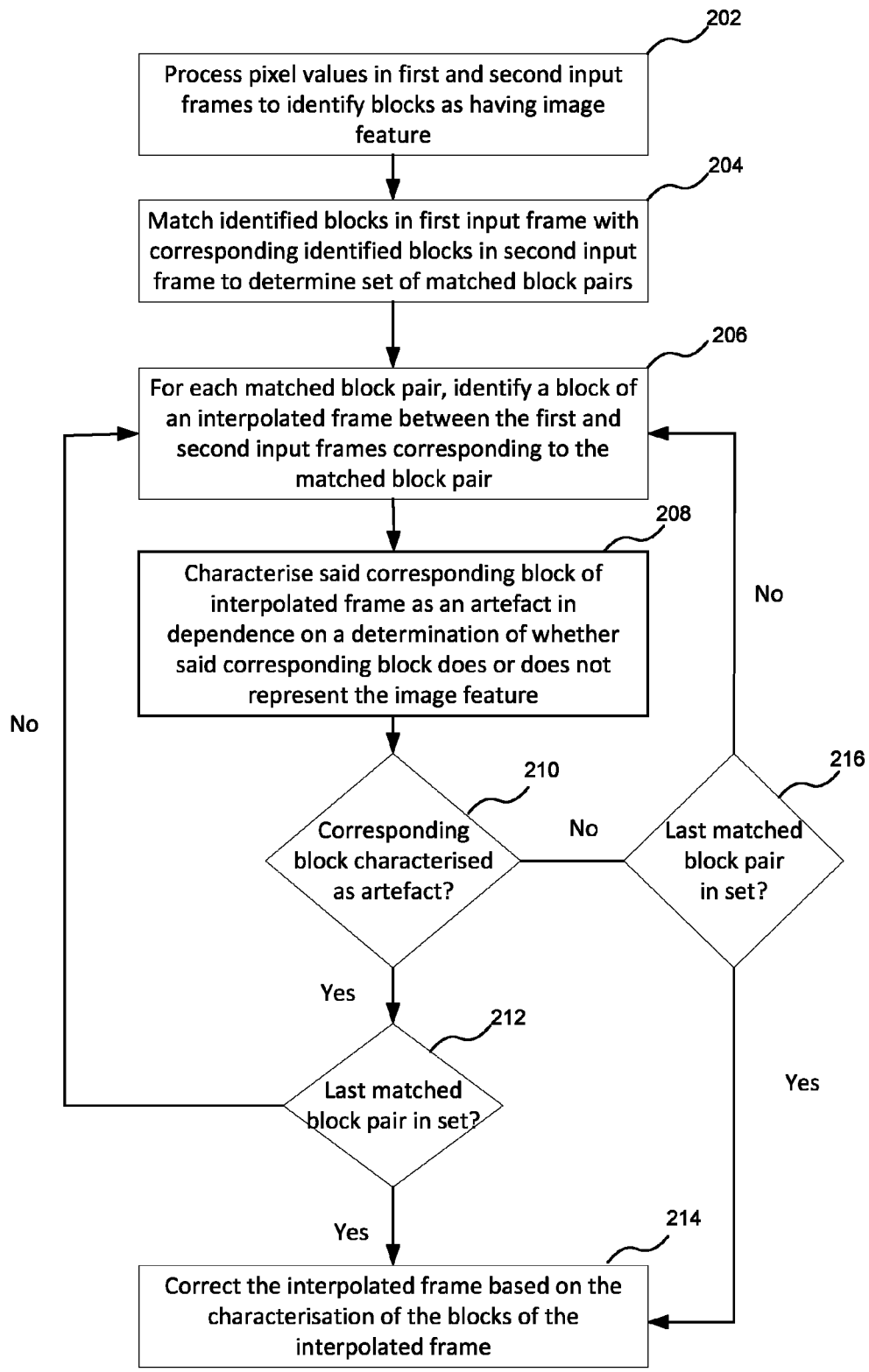
FIG. 2 shows a flowchart for a process of detecting a conversion artefact in an interpolated frame.

The operation of the conversion artefact detector 100 will now be described with reference to the flowchart of FIG. 2. The following description describes the operation of the artefact detector to detect a potential artefact in a single interpolated frame that has been generated from first and second existing frames of the video sequence. This is for the purpose of illustration only and it will be appreciated that the artefact detector may be configured to detect artefacts in a number of interpolated frames included within a video sequence.

First and second input frames are received at the input of the pixel processor 102. At step 202, the pixel processor 102 processes pixel values in the first and second input frames to identify respective blocks as representing an image feature that may require further investigation. A block that has been identified by the processor 102 as representing an image feature may be referred to herein as an "identified block". In the following examples described herein, a 'block' contains only a single pixel. It is to be understood that this is for the purposes of clarity only and the following description is equally applicable to blocks of more than one pixel.

Image features may be features of the image that have been identified as being susceptible to elimination in the interpolated frame. They may be fine details of the image (e.g. a thin line). Image features may be components of the image that are represented by pixels with an associated pixel value that exceeds a threshold. Thus pixels that are identified as representing an image feature may have associated pixel values that exceed a threshold. Pixels with associated pixel values that exceed a threshold may be referred to as 'maxima'. In other words image features may be maxima. Thus the pixel processor 102 may be configured to process pixel values in the first and second input images to identify pixels of maxima in those images. The pixel value may be the luminance, or brightness, or intensity of the pixel or any other suitable value. The pixel processor may thus process pixel values in the first and second input images by determining the luminance/intensity/brightness of each pixel. Pixels with values exceeding a threshold value are identified by the processor 102 as maxima.

The pixel processor 102 may identify a pixel as representing an image feature by comparing the pixel value (e.g. luminance) of the pixel being tested with the pixel values of subsets of pixels local to that pixel. The processor 102 may further compare the pixel value of the pixel being tested against a maxima threshold. The processor 102 may identify a pixel as representing an image feature in response to detecting that the pixel value of the pixel is greater than the maximum pixel value of the subset of pixels local to that pixel and/or that the pixel value of the pixel is greater than the maxima threshold. That is, the processor 102 may process pixel values in the first and second input frames to identify regional maxima. An example of how the pixel processor may identify pixels as representing an image feature is described with reference to FIG. 3.

Figure 3:
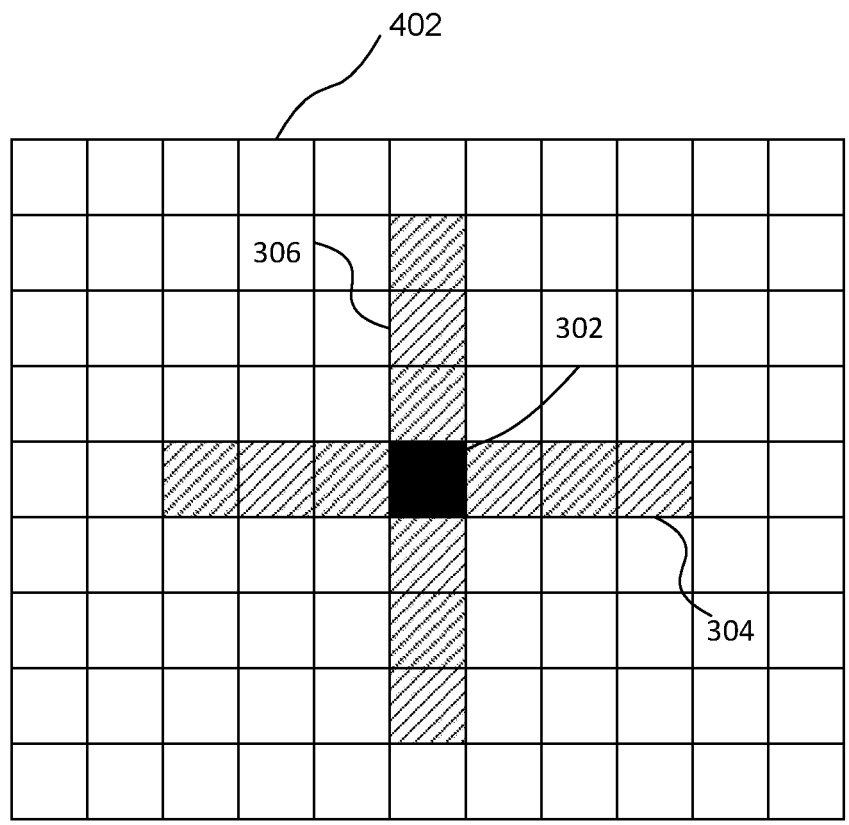
FIG. 3 shows a diagram of an input frame illustrating how a pixel within that frame may be determined to represent an image feature

FIG. 3 shows a pixel array 300 of input frame 402. Pixel processor 102 is currently processing pixel 302 (shaded black) to determine if that pixel represents an image feature. The pixel processor determines the pixel value of pixel 302 and of a subset of its neighbouring pixels, indicated generally at 304 by dashed markings. In this example the subset of neighbouring pixels is the set of three pixels horizontally adjacent to the pixel 302 on either side (i.e. the three pixels to the left of the pixel 302 and the three pixels to the right of the pixel 302). The size of the subset is merely for illustration, and any suitable size of +N and −M pixels could be used, where M=N or M≠N. As an example, N could be 7, so that the pixel value of the pixel 302 is compared with the 7 pixels to the left of the pixel 302 and the 7 pixels to the right of the pixel 302. Thus, in this example, if the pixel value of pixel 302 is greater than the pixel values of each of the pixels in subset 304, and the pixel value of pixel 302 is greater than a maxima threshold, processor 102 identifies pixel 302 as representing an image feature. In other words pixel 302 is identified as a maximum, and more particularly a regional maximum. An analogous procedure is performed on the pixels of the second input frame 406 to identify pixels of the second input frame 406 as maxima.

The pixel processor 102 may be configured to process pixel values by performing separate one-dimensional horizontal and vertical pixel processing on the first and second input frames. Horizontal pixel processing refers to comparing the pixel value of a pixel with a horizontally adjacent subset of pixels (e.g. subset 304). Vertical pixel processing refers to comparing the pixel value of a pixel with a vertically adjacent subset of pixels. For example, pixel processor 102 may compare (as part of a separate vertical pixel processing stage) the value of pixel 302 with the pixel values of a subset of vertically adjacent pixels 306 (indicated by dashed markings). Here again the size of the subset 306 of ±3 pixels is merely for illustration and any suitable size of +N and −M pixels may be used, where N=M or N≠M.

The pixel processor 102 may identify a set of pixels as representing an image feature from each of the horizontal and vertical processing stages. The pixels identified from each of the stages may be combined to form a set of identified pixels for the first input frame, and similarly a set of identified pixels in the second input frame. The set of identified pixels in the first input frame may be denoted as $P_{x,y}$, and the set of pixels identified in the second input frame as $N_{x',y'}$, where x,y denote the position of the identified pixel within the first input frame and x',y' denote the position of the identified pixel within the second input frame.

The first and second input frames received by the pixel processor 102 may be generated from respective first and second existing frames. The first and second existing frames may be output from the FRC. These existing frames may be received at the frame filter 110 prior to being processed by the pixel processor 102. The first and second existing frames may be filtered by the frame filter to generate the first and second input frames received by the processor 102. The frame filter may additionally receive and filter the interpolated frame generated from the FRC 116. Alternatively, the frame filter may be configured to filter only regions of the interpolated frame identified from the identified features in the first and second input frames. The frame filter 110 may be configured to band-pass or high-pass filter the existing frames and the interpolated frame. Band-pass or high-pass filtering the frames broadly eliminates details of the image depicted within the frames except lines and edges of the components forming the image (i.e. the fine image details remain). Thus the filtered images contain image features that are more likely to correspond to image features that are subject to elimination in the interpolated frame, which may reduce the false-positive rate of artefact detection. High-pass filtering additionally sharpens an image by removing low-frequency components that lead to blurring. Band-pass filtering has the benefit of passing a range of high-frequency components of the image (and thus sharpens the image) whilst also removing highest frequency components that contribute to noise. The frame filter may therefore filter the existing frames to generate the input frames having enhanced fine-image detail and/or enhanced edge content. This may increase the number of maxima detected by the processor 102 that correspond to genuine features susceptible to artefact generation.

The frame filter 110 may comprise separate horizontal and vertical finite-impulse response (FIR) filters. A horizontal FIR filter is one which filters the image along the horizontal or x-direction. It may for example filter pixel values of the frame row-wise. A vertical FIR filter is one which filters the image along the vertical or y-direction, for example by filtering pixel values column-wise. The filters may be of any suitable order. They may for example be $8^{th}$ order filters with an impulse response given by e.g. [−1, −2, −1, 2, 4, 2, −1, −2, −1]/8 or some multiple thereof. For each pixel of the frame being filtered by the frame filter 110, the maximum of the horizontal and vertical filtering results is taken and averaged over a kernel to produce a smoothed band-passed image. The kernel may be an n by n box of pixels, for example a 7 by 7 box.

The frame filter may be further configured to scale the pixel values of the filtered images to increase the values by a scale factor. This may be useful in aiding the detection of an image feature, as is described in more detail below.

At step 204 the feature-matching module 104 matches identified pixels in the first input frame $P_{x,y}$ with respective identified pixels in the second input frame $N_{x',y'}$ to determine a set of matched pixel pairs. An 'identified pixel' refers to a pixel identified in step 204 as representing an image feature. An identified pixel may be a maxima, for example. A matched pixel pair thus comprises an identified pixel in the first input image and a corresponding identified pixel in the second input image. An example of a matched pixel pair is shown in FIG. 4. Here, first input image 402 comprises an identified pixel 404 representing an image feature. Pixel 404 is matched to, or corresponds with, pixel 406 in the second input image 408. Pixels 404 and 406 thus constitute a matched pixel pair.

To match the identified pixel 404 ($P_{x,y}$) in the first input frame with the identified pixel 406 ($N_{x',y'}$) in the second input frame, the feature-matching module 104 may be configured to perform a motion estimation stage in which an offset between the pixels of each matched pixel pair is determined. Performing a motion estimation stage enables the conversion artefact detector 100 to accommodate movement of image features between the first and second frames. As part of the motion estimation stage, the feature-matching module 104 may perform a motion search to match identified pixels in the first input frame with identified pixels in the second input frame. The motion search may be performed by the search module 112. The search module may, for each identified pixel in the first input frame, conduct a plurality of search operations in the second input frame to detect a matching identified pixel. The search module may additionally conduct, for each identified pixel in the second input frame, a plurality of search operations in the first input frame to detect a matching identified pixel.

The motion estimation stage performed by the feature-matching module 104 is a separate and different motion estimation stage from the motion estimation stage used to generate the motion vectors to generate the initial interpolated frame. That is, the motion vectors used to generate the interpolated frame are not used to match the identified pixels of the first and second input frames. The reason for this is that if the motion vectors used to generate the interpolated frame were then also used to match the identified pixels of the first and second input frames, artefacts in the interpolated frame would not be detected. To see this, consider that one reason the interpolated frame has blocks with incorrectly eliminated image features is because during the motion estimation stage performed by the FRC, blocks in the first and second input frames were matched without tracking the motion of the image feature of interest (i.e.: the motion vectors chosen for a block may track the motion of the background or foreground image of the scene within that block but do not track small or subtle objects within the block adequately). Using motion vectors that do not track the subtle image features we wish to recover in the feature-matching module 104 would lead to a self-consistency problem whereby the interpolated frame checks regions of source frames without the feature and will conclude that not having the subtle feature is correct.

An example of the search operation performed by the search module 112 will now be described with reference to FIG. 5. In this example, the motion search is being performed in the second input frame 408 to detect the matching identified pixel (e.g. pixel 406) to an identified pixel in the first input frame 402 (e.g. pixel 404). It will be appreciated that the search module operates in an analogous manner if performing the search operation in the first input frame to detect a matching identified pixel to an identified pixel in the second input frame.

The search module 112 conducts a plurality of search operations in the second input frame 408 to detect the matching identified pixel to identified pixel 404 in the first input frame. The search module 112 may be configured to conduct the plurality of search operations along respective directional axes in the second input frame. These "axes" represent different directions in which the search operations can be performed. In this example, the directional search axes (and the pixels lying on those axes) are indicated at 506, 508, 510, 512, 514, 516, 518 and 520. The pixels lying on the search axes are indicated by dashed markings. Thus in this example the search module conducts eight search operations along eight directional axes arranged in a compass-point arrangement. The directional search axes each emanate from a common origin 524. The common origin may be coincident, or co-located, with the identified pixel in the first input frame (e.g. in this example pixel 524 is co-located with pixel 404). That is, the origin of the search axes in the second input frame has the same pixel coordinates with respect to the second input frame as the identified pixel 404 has with respect to the first input frame.

The search module flags candidate matching pixels detected in the plurality of search operations. The candidate matching pixels are indicated in FIG. 5 by the white-filled pixels 522. The search module may perform the search operations in sequential order along each of the directional axes in turn. For example, the search module may perform the first search along a first of the directional axes, flag any identified pixels detected along that axis as potential matching pixels, and then perform a second search along a second directional axis, and so on. The search module may be configured to only flag, or count, the first identified pixel detected along a given directional search axis. That is, the search operation along a directional axis may end when the first identified pixel along that axis has been detected. This may reduce the processing overheard required to perform the search operations. The search operation along each directional axis may be limited to a certain range of pixels from the origin 524. If an identified pixel is not detected within the search range, the search operation along that directional axis ends, and the next search operation is conducted (e.g. until search operations along each directional axis have been conducted). In the example shown in FIG. 5, each search operation is limited to seven pixels along each directional axis. This is for the purposes of illustration, and in general each search operation may be limited to M pixels along each directional axis. M could be 20, for example.

The search module may thus detect a plurality of candidate matching identified pixels ($N_{x',y'}$) in the second input frame for each identified pixel ($P_{x,y}$) in the first input frame. If the search module 112 is configured to only flag the first identified pixel detected on a given directional search axis, the number of candidate matching pixels for each identified pixel in the first input frame will be bound by the number of directions for which search operations are performed for the identified pixel. For the example shown in FIG. 5, the number of candidate matching pixels $N_{x',y'}$ detected in the second input frame for each identified pixel $P_{x,y}$ of the first input frame will be less than or equal to eight.

The search module may be further configured to search additional pixels in the surrounding area of the pixel lying on the directional axis as part of each search operation. For example, the search module may, in addition to searching each pixel lying on vertical axis 506, search each pixel immediately to the right and/or to the left of that axis. Similarly, the search module may, in addition to searching each pixel lying along horizontal axis 510, search each pixel immediately above and/or below that axis. In alternative examples, the search module may additionally search pixels from only one side of the search axis, or it may only search additional pixels (on one or both sides of the search axis) for only a subset of pixels lying on the search axis (for example it may only search additional pixels for every other pixel on the search axis). Searching additional pixels to the ones lying on the search axis makes the search more robust.

Once the search module has determined the candidate matching pixels 522 ($N_{x',y'}$) in the second input frame for the identified pixel 404 in the first input frame, the pixel selector module 114 performs processing on the candidate matching pixels to select a pixel from the set of candidate pixels as the matching identified pixel to the identified pixel 404 ($P_{x,y}$).

To select the matching pixel from the candidates, the selector module 104 may perform sum-of-absolute difference (SAD) calculations to determine the difference in pixel values between a subset of pixels in the second input frame that encompasses the candidate matching pixel, and a corresponding subset of pixels in the first input frame that encompasses the identified pixel 404 ($P_{x,y}$). The SAD calculations may assist the feature-matching module to select a suitable candidate pixel by taking into account how well the region of the second input frame that surrounds the candidate pixel matches the region of the image that surrounds the identified pixel in the first input frame. If the regions match poorly, this indicates that the candidate matching pixel does not correspond to the identified pixel in the first input frame.

The selector module 114 may be configured to select as the matching identified pixel in the second input image the candidate pixel with the lowest associated SAD value.

For a given candidate matching pixel 522, the pixel selector 114 may select as the subset of pixels for use in the SAD calculation the pixels that lie within a predetermined number of pixels of the candidate pixel along the directional axis along which that candidate pixel lies. That is, the SAD calculation for each candidate pixel may be performed along the corresponding directional axis on which that candidate lies. For example, for the candidate matching pixel lying on directional axis 518, the selector module 114 may choose as the subset the pixels within $+N_{range}$ and $-M_{range}$ of that pixel that also lie on axis 518 (where $N_{range}=M_{range}$ or $N_{range} \neq M_{range}$). $N_{range}/M_{range}$ could be any suitable number of pixels. The larger the number, the more likely the correct candidate pixel will be selected at the cost of greater processing overhead. $N_{range}/M_{range}$ could be 7 pixels, for example.

The pixel selector module 114 may be configured to select as the candidate matching pixel the pixel with the best associated SAD value. The 'best' SAD value for the candidate matching pixels may be the lowest value (corresponding to the best overall match between the regions of the first and second input frame over the pixel range of the calculation). In some examples, the selector module 114 may only select the candidate matching pixel with the lowest associated SAD score to be the matching pixel if the SAD score is below a threshold value. If the lowest score is above the threshold value, this may indicate that none of the candidate pixels are likely to correspond to the identified pixel in the first input frame.

Figure 5:
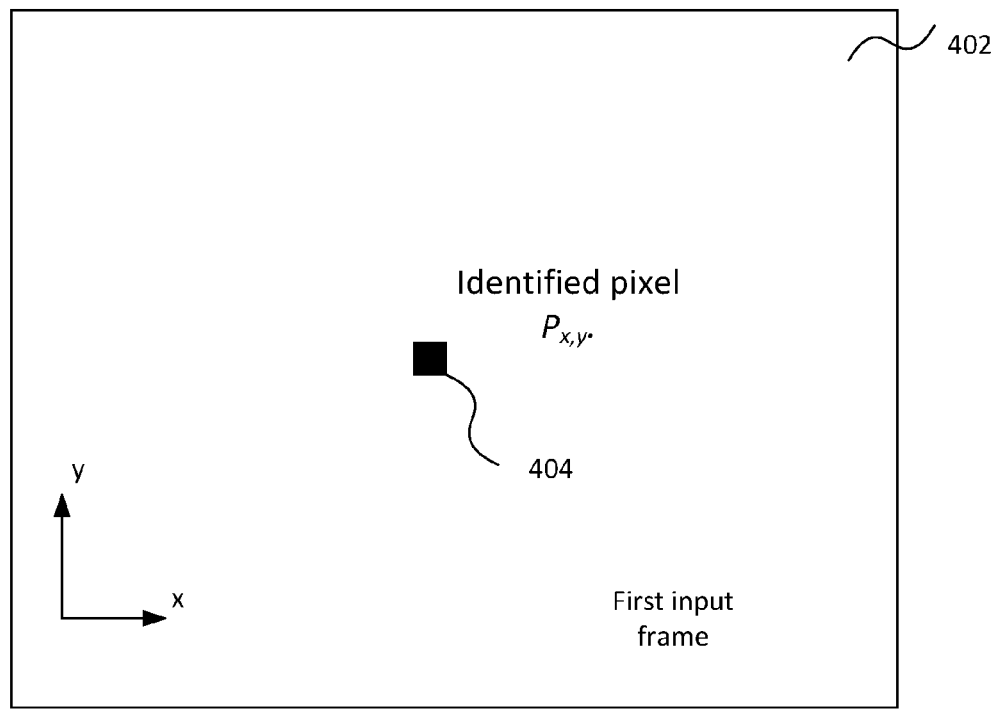
FIG. 5 shows a diagram of a first and second input frame illustrating how an identified pixel in the first input frame can be matched to an identified pixel in the second input frame.
Figure 5:
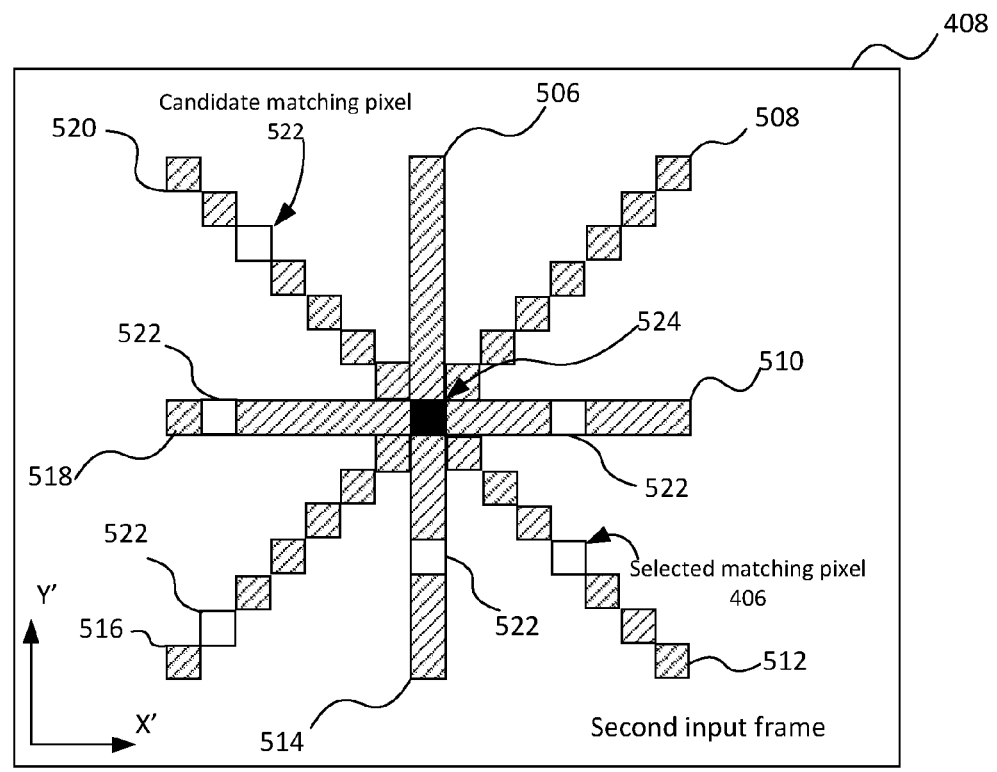

In FIG. 5, the candidate pixel selected as the matching identified pixel 406 is labelled for the purposes of illustration. A matched pixel pair can in general be denoted as $P_{x,y}^{match}$ and $N_{x',y'}^{match}$, where x'=x+i×h; y=y'+i×v; h=−1, 0, +1 and v==1, 0, +1 define the directional axis on which the matched pixel lies and i is an integer. For the matched pixel pair 404 and 406, h=1, v=−1 and i=3. Because the matching identified pixel in the second input frame lies on a directional search axis, the feature-matching module can readily determine a motion estimate between the pixels of the matched pair. For example the feature-matching module may be configured to store the values of h, v and i for each matched pixel pair which indicates the relative positions of the pixels within each pair.

The above example only describes the steps performed by the feature-matching module 104 for a single identified pixel in the first input frame (pixel 404). It will be appreciated that the module 104 repeats the above procedure for each identified pixel in the first input frame to determine a set of matched pixel pairs.

As mentioned above, the search module 112 may additionally, for each identified pixel $N_{x',y'}$ in the second input frame, conduct a motion search in the first input frame to detect a matching identified pixel. Using our current example, the search module would conduct a motion search in the first input frame 402 to detect the identified pixel $P_{x,y}$ that matches the identified pixel 406. The steps performed by the search module when performing the motion search in the first input frame are analogous to those performed when performing the motion search in the second input frame that are described above. That is, the search module performs a plurality of search operations in the first input frame along respective directional axes to identify a set of candidate matching pixels to the pixel 406. These candidate pixels are then processed and a pixel from the candidate is selected as the matching pixel to pixel 406. It follows that if the search module 112 additionally performs a motion search in the first input frame for each identified pixel in the second input frame, the set of matched pixel pairs determined by the feature-matching module comprises a first subset of matched pixel pairs determined from the motion search in the second input frame and a second subset of matched pixel pairs determined from the motion search in the first input frame.

It is possible that the set of matched pixel pairs identified from the motion search in the first input frame may differ from the set of matched pixel pairs identified from the motion search in the second input frame. This may happen if a pair of identified pixels are incorrectly matched during a motion search, for example. Thus performing two motion searches to determine the set of matched pixel pairs may result in a more robust artefact detection because the second motion search can act as a 'check' to the first motion search. This will be explained in more detail below.

An overview of the operation of the feature-detector module 106 will now be described. At step 206 the feature-detector module 106, for each matched pixel pair determined by the feature matching module 104, identifies a pixel of the interpolated frame between the first and second input frames corresponding to the matched pixel pair e.g. based on the positions of the pixels of the matched pixel pair. At step 208 the feature-detector module characterises that corresponding pixel as an artefact in dependence on a determination of whether said corresponding pixel does or does not represent the image feature which is present within the pixels of the matched pixel pair. A "corresponding pixel" refers to a pixel in the interpolated frame that corresponds to a matched pixel pair. Each matched pixel pair may be associated with a respective corresponding pixel in the interpolated frame. In other words, the feature-detector module first identifies whether an image feature represented by matched pixels in the first and second input frames is present in the interpolated frame. It does this by identifying a pixel in the interpolated frame in dependence on the matched pixel pair and processes that pixel to determine if it represents the image feature. The result of this determination is then used to characterise the pixel as an artefact.

The feature-detector module does not necessarily characterise a corresponding pixel of the interpolated frame as an artefact just because it determines that the pixel does not represent an image feature. It may consider a number of factors before characterising the pixel as an artefact (of which whether the pixel represents the image feature is one). This will be discussed in more detail below.

If the feature-detector module 106 does determine that the corresponding pixel in the interpolated frame represents the image feature, then it may conclude that that pixel does not contain a conversion artefact and characterise the pixel accordingly. The feature-matching module may then determine if pixels in the interpolated frame have been identified for each of the matched pixel pairs identified by the feature-matching module 104 (steps 212 and 216). If all of the matched pixel pairs have been processed, the process of artefact detection in the interpolated frame ends and corrective action is taken on the required pixels (step 214). If there remains matched pixel pairs that have not been processed, the feature-detector module processes the interpolated frame to try and detect an image feature for another matched pixel pair (i.e. steps 206 and 208 are repeated).

Examples of how the feature-detector module 106 operates during steps 206 and 208 will now be described. For the purposes of clarity, these examples will describe the operation of the feature-detector module with reference to a single matched-pixel pair (pixels 404 and 406). The module 106 operates analogously for each matched pixel pair of the set of matched pixel pairs identified by the feature-matching module 104. This set of matched pixel pairs may comprise the first and second subsets identified by the respective motion searches in the second and first input frames.

Referring back again to step 206, the feature-detector module first identifies a pixel in the interpolated frame 410 that corresponds to the matched pixel pair 404 and 406. The feature-detector module may be configured to identify this corresponding pixel using the positions of the pixels 404 and 406 forming the matched pixel pair, and the direction of the search axis used in the search operation to identify the matched pixel pair. For example, the feature-detector module may identify the corresponding pixel in the interpolated frame as the pixel located at an intermediate position between the pixels of the matched pixel pairs based on the temporal phase $\varphi$ of the interpolated frame with respect to the first or second input frames. As a specific illustration, if the interpolated frame is included at the mid-point between the first and second input frames, the corresponding pixel in the interpolated frame may be identified as the pixel located at the mid-point between the positions of the matched pixel pair (e.g. pixel 412). If the intermediate position determined from this approach lies between two adjacent pixels in the interpolated frame, the feature-detector module may be configured to select any one pixel adjacent to the intermediate position. The selection may be based on a consistent rule or based on a rounding algorithm, such as bankers rounding. Alternatively, feature-detector module may be configured to test a number of pixels adjacent to the centre point and select one of the pixels based on the intensity values of the pixels.

Alternatively, the feature-detector module 106 may identify the pixel in the interpolated frame that corresponds to the matched pixel pair 404 and 406 by processing a subset of pixels in the interpolated frame and selecting a pixel from the subset. The feature-detector module may be configured to identify the subset of pixels in the interpolated frame 410 in dependence on the positional relationship between the identified pixel 404 in the first input frame and the matching identified pixel 406 in the second input frame. The feature-detector module may for example identify the subset of pixels in the interpolated frame using the motion estimate between the pixels 404 and 406 of the matched pixel pair determined by the feature-matching module 104. Identifying a subset of pixels in the interpolated frame in which to search for the image feature enables the number of pixels to be processed in the interpolated frame to be limited, thereby reducing the processing overhead.

Figure 6:
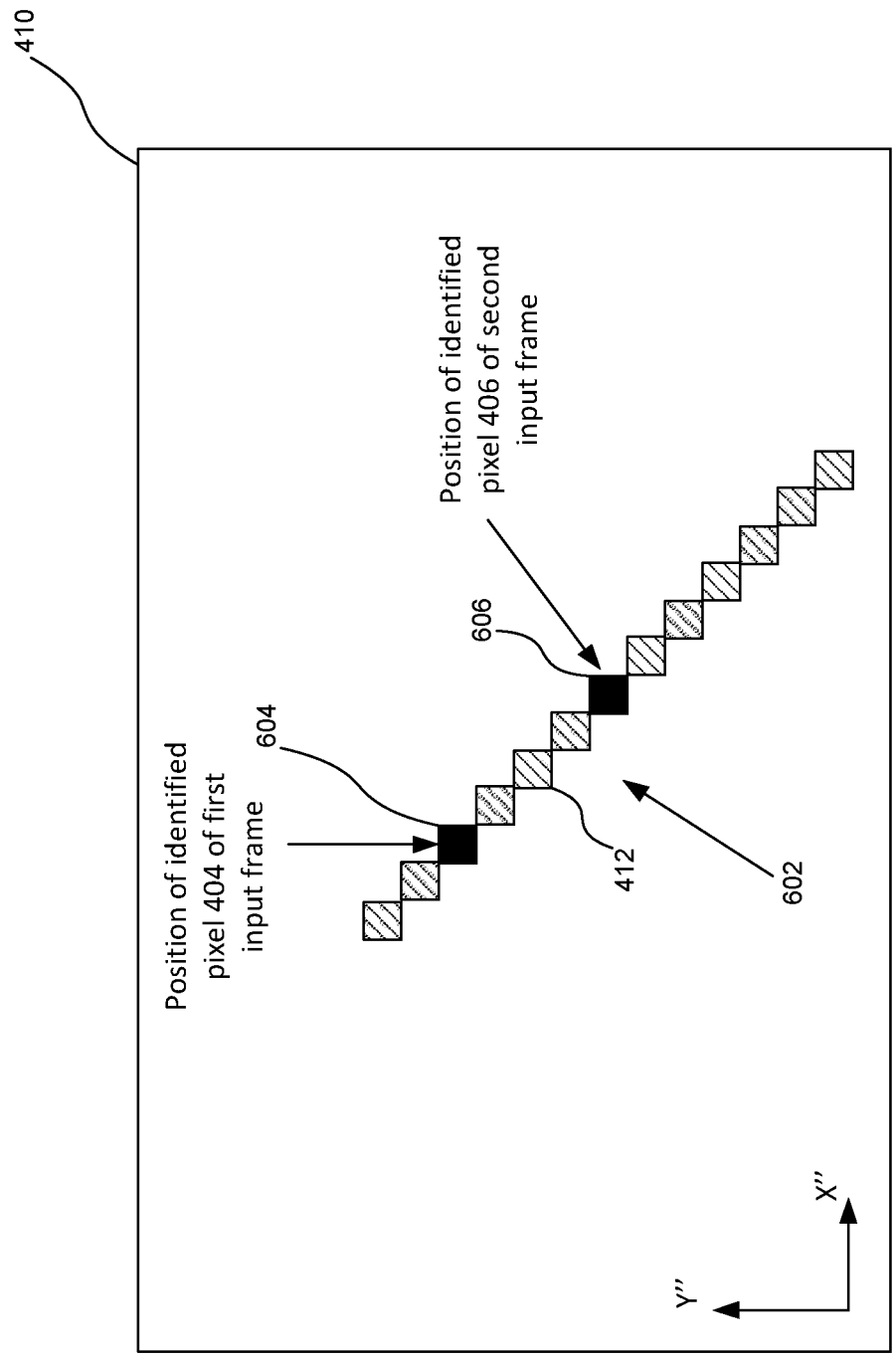
FIG. 6 shows a diagram of an interpolated frame illustrating a subset of pixels that are processed to identify a corresponding pixel of the interpolated frame.

FIG. 6 illustrates an example of how the feature-detector module 106 identifies the subset of pixels in the interpolated frame 410. The position of the matching identified pixel 404 in the first input frame is shown shaded black, denoted at 604, and the position of matching pixel 406 of the second input frame is shown shaded black denoted at 606. The subset of pixels identified by the feature-detector module to be processed to identify the pixel that corresponds to the matched pixel pair 404 and 406 are denoted at 602 by the hatched markings, and includes pixels 604 and 606.

The feature detector module may identify as the subset of pixels the pixels within a certain range of the position of one of the identified pixels of the first and second input frames (i.e. within a range of the position of one of the pixels of the matched pixel pair). In this example, the feature-detector module identifies the subset of pixels as the pixels within ±6 pixels of the identified pixel 406 of the second input frame. In alternative examples the subset of pixels may be identified as being within a certain range of the position of the identified pixel of the first input frame (e.g. pixel 404). The subset of pixels may further lie on an axis that is co-linear with the directional axis of the search operation used to detect the matching identified pixel. In this example, the subset of pixels 602 lie on an axis that is co-linear with the directional axis 512 of the search operation used to detect the matching identified pixel 406. That is, the feature-detector module may identify the subset of pixels as being within $\pm N_{identified}$ pixels of one of the identified pixels along the direction of the search. Thus the feature-detector module may look for a representation of an image feature in the interpolated frame in pixels that lie along the direction of the motion estimate between the matched pixels of the first and second input images. In other words the feature-detector module only searches for a representation of the image feature in the regions of the interpolated frame where a representation is expected to be present based on the positions of the matched image features in the first and second input frames. The feature-detector module may therefore identify the subset of pixels in the interpolated frame in dependence on the position of one pixel of the matched pixel pair and the directional axis of the search operation used to detect the matched pixel pair.

In other examples the feature-detector module 106 may additionally identify the subset 602 as comprising pixels above and below the search axis. This may increase the robustness of the search for the corresponding pixel of the interpolated frame.

Once the subset of pixels in the interpolated frame has been identified the feature-detector module processes the subset to determine the best-match pixel within the subset. The best-match pixel could for example be the pixel with the largest intensity value. In this case the pixel with the largest intensity value is selected as the pixel that corresponds to the matched pixel pair and is denoted $I_{x''y''}^{max}$, where x" and y" denote the position of the selected pixel with respect to the interpolated frame. In this example the corresponding pixel of the interpolated frame is pixel 412.

At step 208 the feature-detector module characterises the corresponding pixel 412 as an artefact in dependence on a determination of whether the pixel does or does not represent the image feature. Thus the feature-detector module determines whether the corresponding pixel represents the image feature or not and uses that determination to characterise the pixel as an artefact. The feature-detector module may not characterise a pixel as an artefact solely on the basis of whether that pixel represents an image feature or not, but may consider other additional factors in combination with that determination. This is discussed below. But first, examples of how the feature-matching module determines if a corresponding pixel of the interpolated frame represents an image feature or not will be described.

With reference to our example, the feature-matching module 106 determines whether pixel 412 represents the image feature that is represented by pixels 404 and 406. The feature-matching module may determine whether the corresponding pixel represents the image feature in dependence on the relative intensities of the corresponding pixel and the identified pixel of the first and second input frames. For example, if the corresponding pixel 412 does represent the image feature, it may be expected to have a similar intensity to the intensities of the identified pixels 404 and 406 (which represent the same image feature).

The feature-detector module may calculate a parameter ($A_{x''y''}$) that indicates either that the corresponding pixel does represent the image feature or does not represent the image feature according to the following equation:

$$A_{x''y''} = \mathrm{Clip}(128 + 2[\tfrac{1}{2}(P_{xy} + N_{x'y'}) - I_{x''y''}^{max}], 0, 255) \qquad (1)$$

The parameter, $A_{x''y''}$, is a numerical value associated with the position of the corresponding pixel (e.g. pixel 412) in the interpolated frame (denoted by the coordinates x" and y"). As part of the parameter calculation the difference between the average intensity of the matching identified pixels $P_{xy}$ and $N_{x'y'}$ and the intensity of the corresponding pixel of the interpolated frame $I_{x''y''}^{max}$ is calculated. This value is then multiplied by a scale factor (in this example 2) and that value is then added to a constant (which in this example is 128) to arrive at a numerical value $N_{in}$ which is indicative of the difference between the average intensity of the matched pixel pair and the intensity of the corresponding pixel of the interpolated frame (i.e. $N_{in} = 128 + 2[\tfrac{1}{2}(P_{xy} + N_{x'y'}) - I_{x''y''}^{max}]$). The numerical value $A_{x''y''}$ is then determined from a 'clip' function that returns the value $N_{in}$ if $x_{min} \leq N_{in} \leq x_{max}$, where in this case $x_{min}=0$ and $x_{max}=255$. If $N_{in}<x_{min}$ then the value of $x_{min}$ is returned and if $N_{in}>x_{max}$ the value of $x_{max}$ is returned. It can be seen that a value of $N_{in}$ which is close to 128 (e.g. closer than a predetermined threshold value, such that $|N_{in}-128| \leq A_{thresh}$) is indicative of the corresponding pixel representing the image feature because it means the intensity of the corresponding pixel is approximately equal to the average of the intensities of the matched pixel pair, which is to be expected if they are representing the same image feature. Conversely, a value of $N_{in}$ which is not close to 128 (e.g. further than the predetermined threshold from 128, such that $|N_{in}-128|>A_{thresh}$) indicates that the corresponding pixel does not represent the image feature because the intensity of the corresponding pixel is not approximately equal to the average intensity of the matched pixel pair, which is to be expected if the image feature is missing from the interpolated frame.

The feature-detector module 106 may thus determine that the corresponding pixel does not represent an image feature (which is present in both $P_{xy}$ and $N_{x'y'}$) if the difference between the parameter $A_{x''y''}$ and 128 exceeds the threshold value (i.e. if $|A_{x''y''}-128|>A_{thresh}$). It may be determined that the corresponding pixel does represent the image feature if the difference between the parameter $A_{x''y''}$ and 128 does not exceed the threshold value (i.e. if $|A_{x''y''}-128| \leq A_{thresh}$).

As mentioned above, the feature-detector module may not characterise a pixel of the interpolated frame solely on whether that pixel does or does not represent the image feature (though it may). For example it may calculate further parameters that are used in conjunction with the parameter $A_{x''y''}$ before characterising a pixel in the interpolated frame as an artefact. The feature-detector module may do this to reduce the false-positive rate thereby reducing instances where a pixel is incorrectly characterised as an artefact. For example, in addition to determining whether a pixel in the interpolated frame represents an image feature, the feature-detector module may further determine an indication of whether the corresponding pixel is expected to represent the image feature or not. If a pixel in the interpolated frame is determined not to represent an image feature but additionally an image feature is not expected to be represented in that pixel, it may be incorrect to characterise that pixel as an artefact. The feature detector module may determine this indication from the intensities of the identified pixels of the matched pixel pair. If the intensities of the identified pixels are particularly low for example, this may indicate that those pixels do not in fact represent an image feature and so an image feature is not expected to be found in the interpolated image.

Therefore, the feature-detector module may calculate a second parameter ($B_{x''y''}$) that indicates whether the corresponding pixel is expected to represent the image feature or not, given by the equation:

$$B_{x''y''} = \tfrac{1}{2}(P_{xy} + N_{x'y'}) \quad (2)$$

The parameter $B_{x''y''}$ is a numerical value associated with the position of the corresponding pixel in the interpolated frame, denoted by the coordinates x" and y". This parameter indicates the average intensity value of the identified pixels of the matched pixel pair (e.g. pixels 404 and 406). If the value of $B_{x''y''}$ is relatively high, for example above a threshold value (denoted e.g. $B_{thresh}$), then this may indicate that the corresponding pixel of the interpolated frame is expected to represent the image feature. This is because a relatively high value indicates that the matched identified pixels $P_{xy}$ and $N_{x'y'}$ represent an image feature; it may indicate that the identified pixels represent maxima, for example. If the matched pixel pair are both maxima then it is to be expected that the interpolated frame contains a corresponding maxima. Conversely, if the value of the parameter is relatively low (for example it's below the threshold value) then this may indicate that the matched pixel pair do not represent an image feature (e.g. the identified pixels were incorrectly identified as maxima) and thus a corresponding image feature is not to be expected in the interpolated frame.

The feature-detector module may use the first and second parameters to test whether the corresponding pixel of the interpolated frame is an impaired pixel. The module may determine that the corresponding pixel is an impaired pixel if it detects that the value of the first parameter $A_{x''y''}$ is above its threshold value and the value of the second parameter $B_{x''y''}$ is above its threshold value. In other words, the corresponding pixel of the interpolated frame may be determined to be impaired if it is detected to not represent the image feature when the image feature is expected to be present.

In another example, the feature-detector module may determine whether the corresponding pixel is impaired using the first and second parameters along with a local activity measure (denoted $E_{x''y''}$) and a measure of the similarity between a region of the interpolated frame encompassing the pixel 412 and a corresponding region in the first or second input frames. The measure of similarity may for example be the result of a SAD calculation, denoted $SAD_{INTERP}$. The feature-detector module may for example determine if the corresponding pixel 412 is impaired using the following Boolean logic:

$$\text{if} \begin{cases} |A_{x''y''} - 128| > \text{threshold value } A_{thresh} \\ \text{AND } (B_{x''y''} > \text{threshold value } B_{thresh}) \\ \text{AND } (E_{x''y''} < \text{threshold value } E_{thresh}) \\ \text{AND } (SAD_{INTERP} > \text{threshold value } SAD_{thresh}) \end{cases}$$

TRUE else

FALSE

In this example the parameters $E_{x''y''}$ and $SAD_{INTERP}$ are used in conjunction with the parameters $A_{x''y''}$ and $B_{x''y''}$ to determine whether a pixel of the interpolated frame is impaired. It will be appreciated that the threshold values $A_{thresh}$, $B_{thresh}$, $E_{thresh}$ as well as the value 128 may be constant, or predetermined values that are implementation-specific. The local activity measure $E_{x''y''}$ is an indication of the intensity of the pixel 412 in the interpolated frame compared to the average of its neighbouring pixels. The local activity measure $E_{x''y''}$ may be indicative of aliasing. Aliasing may occur when multiple matches are found for a given pixel in an input frame when trying to identify the matched pixel pairs. For example, if multiple valid matches to the identified pixel 404 are found in frame 408 it may be difficult to know how the subtle image feature represented by pixel 404 is moving between the frames. If it is unknown how the subtle image feature is moving between the frames of the sequence so that the estimated motion cannot be known with any real certainty, the estimated motion may not be trustworthy to use for detecting missing objects in the interpolated frame. Similarly, if multiple pixel matches are found along a search axis, then this may be indicative of an aliasing problem. For example, if matching pixels for pixel 404 are found at four different locations along a search axis (e.g. axis 510) in frame 408, this may suggest four different valid pixels within the interpolated frame that may represent the image feature represented by pixel 404. In these cases it may be difficult to work out where the matching image feature is in the interpolated frame and the cost in doing so (e.g. in computing resources, processing time etc.) may outweigh the benefit of potentially detecting a conversion artefact. It may therefore be useful to know the likelihood that aliasing has occurred so that the conversion artefact detector can choose not to try and apply any corrective action to the interpolated frame. A higher value for the local activity measure $E_{x''y''}$ may indicate that aliasing has not occurred (or is unlikely to have occurred), whereas a lower value may indicate that aliasing has occurred (or is likely to have occurred). The value of the threshold $E_{thresh}$ may be chosen so that values of the activity measure below the threshold indicates that aliasing is likely to not have occurred and a value of activity measure above the threshold indicates that aliasing is likely to have occurred.

The region of the input frame used in the SAD calculation may be determined using the original motion vector associated with a block encompassing the pixel 412 determined when the interpolated frame was generated. The value of $SAD_{INTERP}$ indicates how well the region of the interpolated frame and the input frame match. If the level of agreement is relatively low (i.e. if $SAD_{INTERP}$ is high) this may suggest that pixel 412 of the interpolated frame is likely impaired.

The feature-detector module 106 may characterise the pixel 412 as an artefact in response to detecting that the pixel is impaired, and may characterise the pixel 412 as not being an artefact in response to detecting that the pixel is not impaired. That is, all pixels determined to be impaired may be characterised as artefacts.

Alternatively, if the pixel 412 is impaired the module 106 may additionally determine the number of other impaired pixels in the interpolated frame within its vicinity before characterising it as an artefact. These other impaired pixels are pixels in the interpolated frame that correspond to the other matched pixel pairs determined by the feature-matching module 104. This is described with reference to FIG. 7, which shows a set of impaired pixels 702 (denoted by hatched markings) in interpolated frame 410. Exemplary impaired pixel 412 is shown for illustration, with the vicinity around the pixel denoted 704.

The vicinity 704 may be a region of M by M pixels centred on the pixel 412. M may for example be 15. In the example shown in FIG. 7, M=7. If the number of other impaired pixels 702 in the vicinity is greater than a threshold value, then the feature-detector module 104 characterises impaired pixel 412 as an artefact. If the number of other impaired pixels is below the threshold value, then impaired pixel 412 is characterised as not being an artefact. If the set of matched pixel pairs comprises first and second subsets (corresponding to the respective motion searches in the second and first input frames), then the number of impaired pixels within the vicinity of pixel 412 may be calculated using the impaired pixels corresponding to the first subset and second subset separately. For example, impaired pixels 702 may correspond to the first subset of matched pixel pairs only. An impaired pixel may be characterised as an artefact if the number of impaired pixels in its vicinity corresponding to either the first or second subset of matched pixels pairs exceeds the threshold value.

Figure 7:
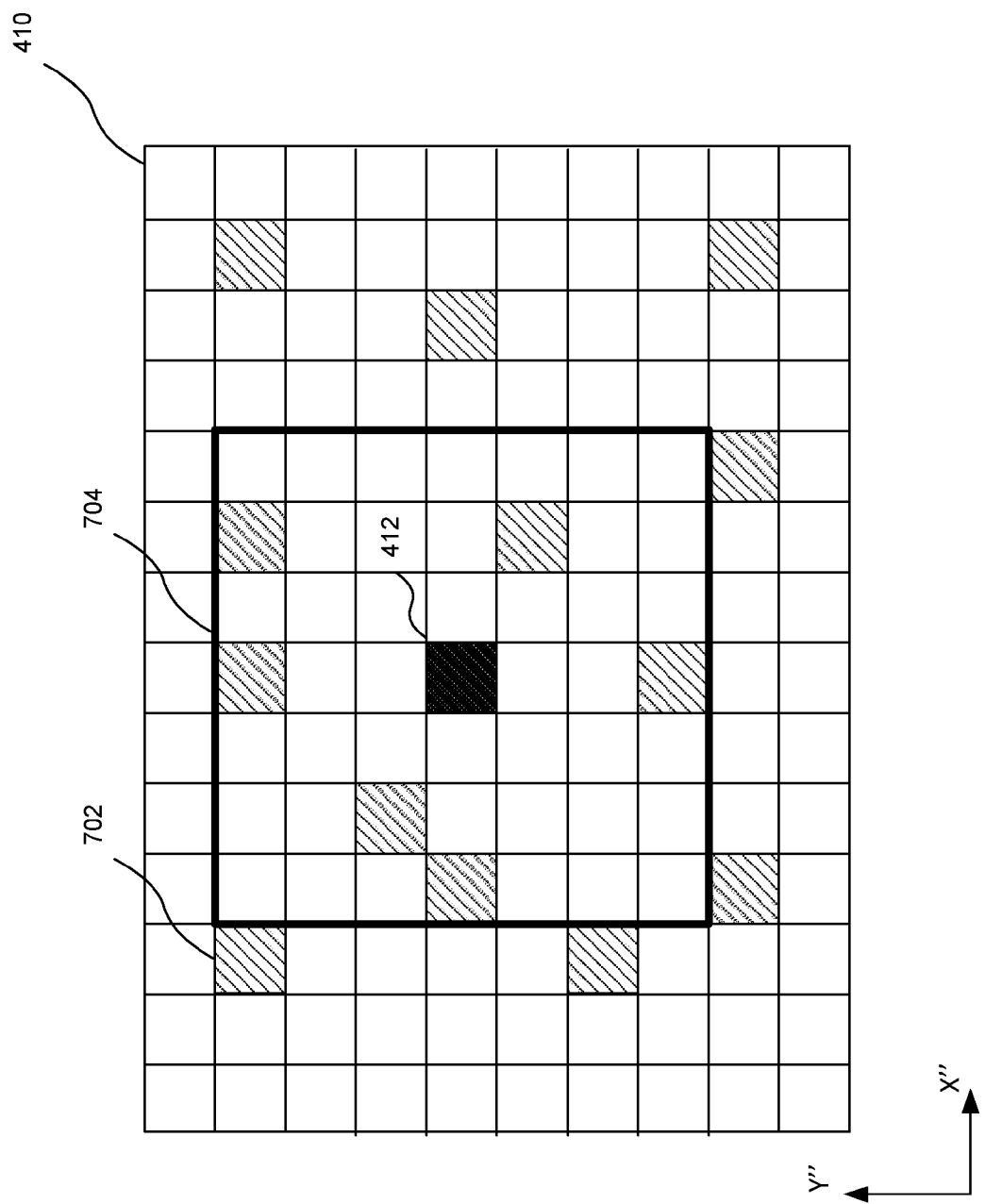
FIG. 7 shows a diagram of an interpolated frame illustrating a set of pixels characterised as artefacts.

To determine the number of other impaired pixels within the vicinity of pixel 412, the feature-detector module 412 may create and store in memory a bit array of each impaired pixel of the interpolated frame. The bit array may contain information on the position of each impaired pixel. FIG. 7 may as such be viewed as a representation of the information stored by the bit array. The bit array may be updated each time the feature-detector module processes a matched pixel pair. Thus the feature-detector module may first identify all of the impaired pixels of the interpolated frame (e.g. as described above for the example of pixel 412), and then for each of those impaired pixels determine the number of other impaired pixels in its vicinity. In the event the set of matched pixel pairs comprises first and second subsets (corresponding to the respective motion searches in the second and first input frames), respective bit arrays may be generated for each subset. That is, the first bit array contains information on the position of the impaired pixels corresponding to matched pixel pairs from the first subset, and the second bit array contains information on the position of the impaired pixels corresponding to the matched pixel pairs from the second subset. The number of impaired pixels in the vicinity may be determined using the first and second bit arrays separately. An impaired pixel may be characterised as an artefact if the number of other impaired pixels in its vicinity according to either the first or second bit arrays exceeds the threshold value. Only characterising an impaired pixel as an artefact if there are a predetermined number of other impaired pixels in its vicinity may prevent the artefact detector from taking corrective action for isolated pixels that are unlikely to adversely affect the picture quality perceived by the user.

The feature detector module repeats steps 206 and 208 for each of the matched pixel pairs identified by the feature-matching module 104 to potentially determine a set of pixels in the interpolated frame characterised as artefacts. Once this has been done the refinement module 116 may optionally refine these results by further characterising other pixels of the interpolated frame as artefacts to determine regions of the interpolated image that require correction. An example of how the refinement module may operate will now be described with reference to FIG. 8.

Figure 8:
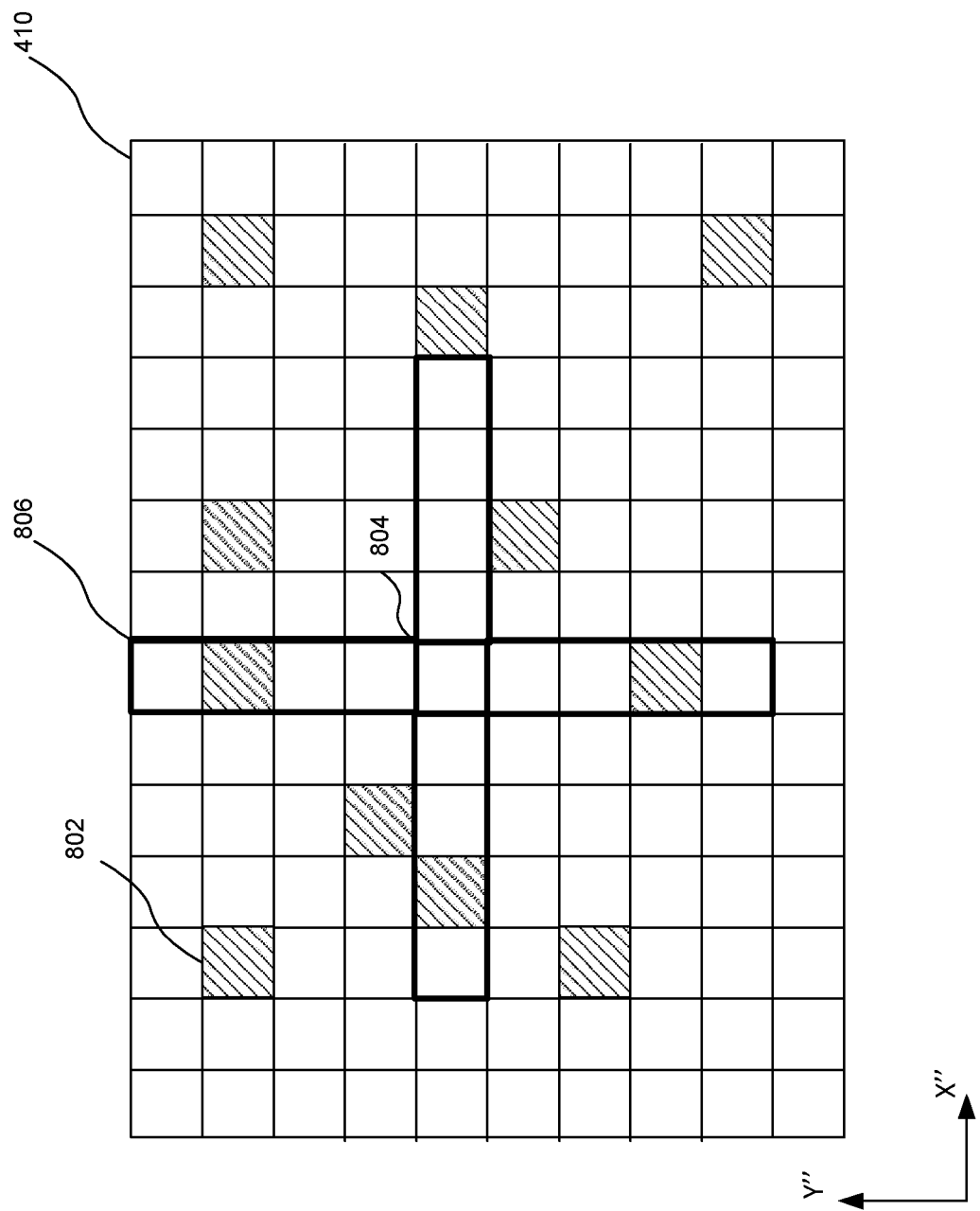
FIG. 8 illustrates an operation of a refinement module.

FIG. 8 shows the interpolated frame 410 with the set of pixels characterised as artefacts by the feature-detector module indicated by the hatched markings (an example of which is shown at 802). For each pixel of the interpolated frame (e.g. pixel 804), the refinement module determines the number of pixels within its vicinity that have been characterised by the feature-detector module as artefacts. The vicinity may for example be a window or region of pixels centred on the pixel 804. In this example the vicinity 806 comprises a range of pixels extending horizontally and a range of pixels extending vertically and centred on the pixel 804. If the number of artefacts within the vicinity of pixel 804 is greater than a threshold value then the refinement module characterises pixel 804 as an artefact. It should be noted that in contrast to the feature-matching module 106, the refinement module 116 characterises the pixel 804 as an artefact independently of whether that pixel does or does not represent an image feature. The refinement module thus performs a grow operation in which pixels that were not characterised as artefacts by the feature-detector module are subsequently characterised as artefacts that require corrective action.

The refinement module may therefore identify regions of contiguous pixels in the interpolated frame that require corrective action. The refinement module may be considered to be 'filling in the gaps' of the interpolated frame created by having disparate artefacts located throughout the frame. This may improve the quality of the corrected interpolated frame once the corrective action has been taken, as will be explained in more detail below.

At step 214, the corrector module 108 corrects the interpolated frame based on the characterisation of the pixels of the interpolated frame. The corrector module may correct each pixel of the interpolated frame characterised as an artefact, for example the pixels characterised as artefacts by the feature-detector module and/or the corrector module.

The corrector module may use a number of different corrective techniques. The corrector module may for example apply a smoothing operation to smooth the values of each pixel characterised as an artefact using the values of neighbouring pixels. The corrector module may apply the smoothing operation using an aperture in horizontal and/or vertical direction. It is with reference to the smoothing operation how one can see how the corrector module may improve the quality of the corrected interpolated frame. Applying the smoothing operation to a region of contiguous pixels in the interpolated frame may result in an overall smoother corrected image compared to the situation in which smoothing operations are applied to disparate pixels throughout the frame. Alternatively, the corrector module may replace a pixel in the interpolated frame characterised as an artefact with one of the identified pixels in the first or second input frames (i.e. with one of the pixels $P_{x,y}$ or $N_{x',y'}$), or with a blend of identified pixels in the first and second input frames (e.g. an artefact pixel (such as pixel 412) could be replaced with a blend of its associated matched pixel pair (pixels 404 and 406)). This approach would correct the artefact by placing the image feature into the interpolated frame.

The artefact detector of FIG. 1 is shown as comprising a number of functional blocks, or modules. This is schematic only and is not intended to define a strict division between different logic elements of an artefact detector. Each functional block or module may be provided in any suitable manner. It is to be understood that intermediate values described herein as being formed by a module, or processor, need not be physically generated by the module/processor at any point and may merely represent logical values which conveniently describe the processing performed by the module/processor between its input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an artefact detector configured to perform any of the methods described herein, or to manufacture an artefact detector comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an artefact detector will now be described with respect to FIG. 9.

Figure 9:
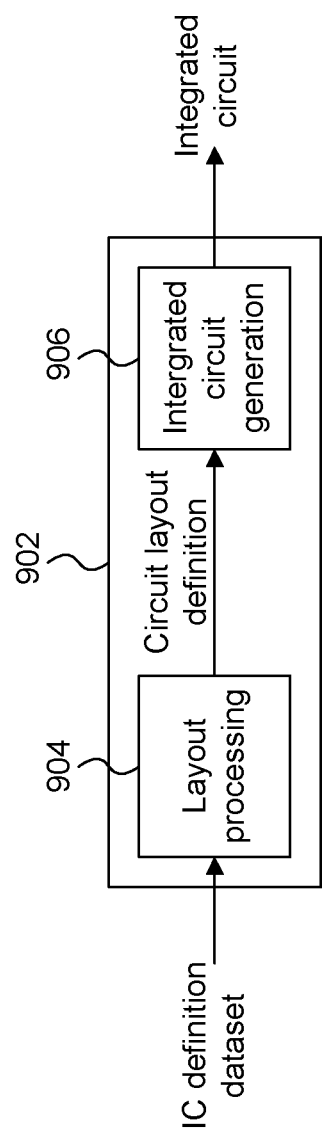
FIG. 9 shows an integrated circuit manufacturing system.

FIG. 9 shows an example of an integrated circuit (IC) manufacturing system 902 which comprises a layout processing system 904 and an integrated circuit generation system 906. The IC manufacturing system 902 is configured to receive an IC definition dataset (e.g. defining an artefact detector as described in any of the examples herein), process the IC definition dataset, and generate an IC according to the IC definition dataset (e.g. which embodies an artefact detector as described in any of the examples herein). The processing of the IC definition dataset configures the IC manufacturing system 902 to manufacture an integrated circuit embodying an artefact detector as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an artefact detector without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of detecting artefacts in a video sequence comprising interpolated frames generated by performing a first motion estimation stage, the method comprising:
    processing pixel values in first and second input frames of the video sequence to identify respective blocks of one or more pixels representing an image feature;
    matching identified blocks in the first input frame with corresponding identified blocks in the second input frame to determine a set of matched block pairs;
    for each matched block pair:
        (i) identifying a block of an interpolated frame between the first and second input frames corresponding to the matched block pair; and
        (ii) characterising said corresponding block of the interpolated frame as an artefact in dependence on a determination of whether said corresponding block does or does not represent the image feature; and
    correcting the interpolated frame based on the characterisation of the blocks of the interpolated frame.

2. A method as claimed in claim 1, wherein the method further comprises receiving first and second existing frames in the video sequence and filtering said existing frames to generate the first and second input frames having enhanced fine image-detail, and identifying respective blocks of one or more pixels representing image features depicting fine image-detail.

3. A method as claimed in claim 1, wherein the pixel values in the first and second input frames are processed to determine the intensity of each processed pixel and a block is identified as representing an image feature in response to identifying the block as a regional maximum, a block being identified as a regional maximum in response to at least one of:
    (i) detecting that the intensity of said block is greater than the intensity of each pixel of a subset of local pixels;
    (ii) detecting that the intensity of said block is greater than a predetermined threshold value.

4. A method as claimed in claim 1, wherein the method comprises performing a second motion estimation stage to match identified blocks in the first input frame with respective identified blocks in the second input frame by conducting, for each identified block in the first input frame, a motion search in the second input frame to detect a matching identified block, and determining a motion estimate between the blocks of each matched block pair.

5. A method as claimed in claim 4, wherein the motion search comprises a plurality of search operations along respective directional axes emanating from a common origin that is coincident with the identified block in the first input frame.

6. A method as claimed in claim 5, wherein the method further comprises: flagging identified blocks detected in the plurality of search operations as candidate matching blocks to the identified block in the first input frame; and performing pixel processing on the candidate matching blocks in the second input frame to select a block from the candidate blocks as the matching identified block to the identified block in the first input frame.

7. A method as claimed in claim 5, wherein the motion estimate between the blocks of each matched block pair is determined from the directional axis of the search operation used to detect the respective matching block in the second input frame.

8. A method as claimed in claim 4, wherein the method further comprises, for each identified block in the second input frame, conducting a motion search in the first input frame to detect a matching identified block to thereby determine a set of matched block pairs comprising a first subset determined from the motion search in the second input frame and a second subset determined from the motion search in the first input frame.

9. A method as claimed in claim 4, wherein the method comprises, for each matched block pair, identifying the block of the interpolated frame corresponding to the matched block pair using the motion estimate between the blocks of the matched block pair.

10. A method as claimed in claim 4, wherein the method comprises, for each matched block pair, processing a subset of pixels in the interpolated frame to identify said corresponding block of the interpolated frame, wherein the subset of pixels in the interpolated frame is identified in dependence on the position of one block of the matched block pair and the directional axis of the search operation used to detect the matching block of the matched block pair.

11. A method as claimed in claim 10, wherein the subset of pixels in the interpolated frame are processed to determine the block within the subset with the largest intensity value, that block being identified as said corresponding block of the interpolated frame.

12. A method as claimed in claim 1, wherein the method further comprises, for each matched block pair: processing said corresponding block to determine its intensity and calculating a first parameter associated with said corresponding block that indicates either that said corresponding block represents the image feature or does not represent the image feature, the first parameter being calculated from the difference between the intensity value of said corresponding block and an average of intensity values of the matched block pair in the first and second input frames.

13. A method as claimed in claim 12, wherein said corresponding block is determined not to represent the image feature if the magnitude of a difference between the value of the first parameter and a predetermined value is greater than a threshold value, and said corresponding block is determined to represent the image feature if the magnitude of the difference between the value of the first parameter and the predetermined value is less than the threshold value.

14. A method as claimed in claim 12, wherein the method further comprises calculating a second parameter based on the intensities of the matched block pair that indicates whether said corresponding block of the interpolated frame is expected to represent the image feature or not.

15. A method as claimed in claim 14, wherein the method comprises determining that said corresponding block is an artefact in response to determining from the first and second parameters that said corresponding block does not represent the image feature and that said corresponding block is expected to represent the image feature.

16. A method as claimed in claim 1, wherein said corresponding block is characterised as an artefact in response to detecting a set of conditions comprising:
   i) determining that said corresponding block does not represent the image feature; and
   ii) detecting a predetermined number of other blocks in the interpolated image corresponding to other matched block pairs within a vicinity of said corresponding block that do not represent an image feature.

17. A method as claimed in claim 1, wherein the method further comprises further characterising as an artefact each block of the interpolated frame that has within its vicinity a number of blocks characterised by the feature-detector module as an artefact greater than a threshold value, independently of whether said each block does or does not represent an image feature.

18. A method as claimed in claim 1, wherein each block of the interpolated frame characterised as an artefact is corrected by replacing that block with one of: i) the identified block of the first input frame from the corresponding matched block pair; ii) the identified block of the second input frame from the corresponding matched block pair; iii) a blend of the identified blocks of the corresponding matched block pair.

19. An artefact detector configured to detect artefacts in a video sequence comprising interpolated frames generated by performing a first motion estimation stage, the detector comprising:
   a pixel processor configured to process pixel values in first and second input frames of the video sequence to identify respective blocks of one or more pixels representing an image feature;
   a feature-matching module configured to match identified blocks in the first input frame with corresponding identified blocks in the second input frame to determine a set of matched block pairs;
   a feature-detector module configured to, for each matched block pair: (i) identify a block of an interpolated frame between the first and second input frames corresponding to the matched block pair, and (ii) characterise said corresponding block of the interpolated frame as an artefact in dependence on a determination of whether said corresponding block does or does not represent the image feature; and
   a corrector module configured to correct the interpolated frame based on the characterisation of the blocks of the interpolated frame.

20. A non-transitory computer readable storage medium having stored thereon computer readable instructions that, when executed at a computer system, cause the computer system to perform a method of detecting artefacts in a video sequence comprising interpolated frames generated by performing a first motion estimation stage, the method comprising:
   processing pixel values in first and second input frames of the video sequence to identify respective blocks of one or more pixels representing an image feature;
   matching identified blocks in the first input frame with corresponding identified blocks in the second input frame to determine a set of matched block pairs;
   for each matched block pair:
      (i) identifying a block of an interpolated frame between the first and second input frames corresponding to the matched block pair; and
      (ii) characterising said corresponding block of the interpolated frame as an artefact in dependence on a determination of whether said corresponding block does or does not represent the image feature; and
   correcting the interpolated frame based on the characterisation of the blocks of the interpolated frame.

* * * * *